(12) United States Patent
Liao et al.

(10) Patent No.: US 10,323,963 B2
(45) Date of Patent: Jun. 18, 2019

(54) FLEXIBLE OPTICAL MEASURING DEVICE

(71) Applicant: NATIONAL APPLIED RESEARCH LABORATORIES, Taipei (TW)

(72) Inventors: Tai-Shan Liao, Hsinchu (TW); Chi-Hung Huang, Hsinchu (TW); Chun-Li Chang, Hsinchu (TW); Shih-Jie Chou, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 0 days.

(21) Appl. No.: 15/835,042

(22) Filed: Dec. 7, 2017

(65) Prior Publication Data

US 2019/0120661 A1    Apr. 25, 2019

(30) Foreign Application Priority Data

Oct. 20, 2017  (TW) .............................. 106136210 A

(51) Int. Cl.
*G01B 9/02*          (2006.01)
*G01D 5/26*         (2006.01)
(Continued)

(52) U.S. Cl.
CPC ........... *G01D 5/268* (2013.01); *G01B 11/026* (2013.01); *G01C 3/08* (2013.01); *G01S 17/08* (2013.01); *G02B 6/3825* (2013.01)

(58) Field of Classification Search
CPC ........ G01D 5/268; G01B 11/026; G01B 9/02; G01B 9/02049; G01B 9/0205;
(Continued)

(56) References Cited

U.S. PATENT DOCUMENTS 4,165,936 A    8/1979  Eisenring et al.
4,572,949 A *  2/1986  Bowers ................. G01H 9/006
                                            250/227.27
(Continued)

FOREIGN PATENT DOCUMENTS

CN          203535218 U     4/2014
CN          104849718 B     2/2017
(Continued)

*Primary Examiner* — Kara E. Geisel
*Assistant Examiner* — Jonathon Cook
(74) *Attorney, Agent, or Firm* — Muncy, Geissler, Olds & Lowe, P.C.

(57) ABSTRACT

A flexible optical measuring device comprises an optical distance measuring module, an optical fiber adapter and an optical coupling module. The optical distance measuring module comprises a light source, an optical receiver and a computing unit. The optical fiber adapter is disposed and connected between the optical distance measuring module and the optical coupling module. The optical coupling module comprises a first optical fiber, a two-in-one optical coupler, a detector and a second optical fiber. A measuring beam is emitted from the light source and reaches the detector. The measuring beam then passes through the detector to the object and forms a reflected beam which is reflected back to the detector, then enters the second optical fiber and passes through the optical receiver and the optical receiver outputs a measurement signal. The computing unit calculates the distance between the object and a terminal of the detector accordingly.

11 Claims, 8 Drawing Sheets

(51) Int. Cl.
*G01B 11/02* (2006.01)
*G02B 6/38* (2006.01)
*G01C 3/08* (2006.01)
*G01S 17/08* (2006.01)

(58) Field of Classification Search
CPC ....... G01B 9/02057; G01C 3/08; G01S 17/08; G02B 6/3825
USPC .................................. 356/482, 498
See application file for complete search history.

(56) References Cited

U.S. PATENT DOCUMENTS

| | | | | |
|---|---|---|---|---|
| 4,596,466 A | * | 6/1986 | Ulrich | .................... G01D 5/268 356/497 |
| 5,402,236 A | * | 3/1995 | Brown | .................... G01B 9/02 250/227.27 |
| 6,545,749 B1 | | 4/2003 | Andersson | |
| 7,177,015 B2 | | 2/2007 | Ohtomo et al. | |
| 2005/0244096 A1 | * | 11/2005 | Jeffers | ................ G01B 9/02007 385/15 |
| 2006/0109479 A1 | * | 5/2006 | Tai | .................... G01D 5/35303 356/482 |
| 2007/0002331 A1 | * | 1/2007 | Hall | .................. G01B 11/0675 356/503 |
| 2011/0037987 A1 | * | 2/2011 | Gurny | ................. G01B 11/007 356/496 |
| 2013/0188195 A1 | * | 7/2013 | Messerschmidt | ........ G02B 6/26 356/479 |

FOREIGN PATENT DOCUMENTS

| | | |
|---|---|---|
| TW | I486615 B | 6/2015 |
| TW | I595252 B | 8/2017 |

* cited by examiner

FLEXIBLE OPTICAL MEASURING DEVICE

CROSS REFERENCE TO RELATED APPLICATIONS

This Non-provisional application claims priority under 35 U.S.C. § 119(a) on Patent Application No(s). 106136210 filed in Taiwan, Republic of China on Oct. 20, 2017, the entire contents of which are hereby incorporated by reference.

BACKGROUND

Technology Field

This disclosure relates to a technical field of an optical measuring device, and more particularly to a flexible optical measuring device with coaxial measuring function and capable of bending an optical path arbitrarily.

Description of Related Art

The principle of a traditional optical measuring is to emit a very thin laser beam to an object, and then a photoelectric element receive the laser beam reflected from the object. A distance between a measuring device and the object is calculated by measuring time of the laser beam from being emitted to being received via a computing unit. Said traditional optical measuring device is provided with a light-emitting module and a light-receiving module, both of which are fixed on a same base line, and are influenced by a size of the optical measuring device, such that a spacing is provided in a light spot center of the light-emitting module and a lens center of the light-receiving module. When the spacing is shorter, it means that the traditional optical measuring device can measure the object with closer distance; on the other hand, when the spacing between the light spot center of the light-emitting module and the lens center of the light-receiving module is longer, it means that a distance between the traditional optical distance measuring device and the object need to be longer enough to be measured. In general, the distance between the traditional optical distance measuring device and the object should be more than 5 cm to process the measurement, otherwise, the laser beam which is emitted from the optical measuring device to the object and is reflected by the object can not reach the light-receiving module.

In addition, the traditional optical measuring device can only measure the distance in a straight line in front of the light-emitting module. If the detection environments in some machine or inside of transmission pipelines, a direction of the laser beam emitted from the light-emitting module can not be changed arbitrarily, which hinders the operation of the measurement.

In view of this, providing a flexible optical measuring device having a coaxial measuring function and capable of bending an optical path arbitrarily to adapt to various unfriendly detection environment and to reduce obstacle in measurement is an important subject in the field.

SUMMARY

To achieve the above-mentioned objective, this disclosure provides a flexible optical measuring device for measuring a distance between the device and an object. The flexible optical measuring device comprises an optical distance measuring module, an optical fiber adapter and an optical coupling module. The optical distance measuring module comprises a light source, an optical receiver and a computing unit. The light source provides a measuring beam, the optical receiver receives a reflected beam reflected from the object, and outputs a measurement signal. The computing unit receives the measurement signal. The optical fiber adapter is disposed and connected between the optical distance measuring module and the optical coupling module. The optical coupling module comprises a first optical fiber, a two-in-one optical coupler, a detector and a second optical fiber. The one end of the first optical fiber is disposed corresponding to the light source via the optical fiber adapter. The two-in-one optical coupler connected with the other end of the first optical fiber. The detector is disposed on one side of the two-in-one optical coupler opposing to the first optical fiber. The one end of the second optical fiber is disposed corresponding to the optical receiver via the optical fiber adapter, and the other end of the second optical fiber is connected to another side of the two-in-one optical coupler, and the first optical fiber is also connected to said another side of the two-in-one optical coupler. The measuring beam is emitted from the light source and consecutively passes through the first optical fiber, the two-in-one optical coupler and reaches the detector and then the measuring beam which is emitted from light source passes through the detector, projects to the object, and forms the reflected beam, and the reflected beam is reflected back to the detector then enters the second optical fiber via the two-in-one optical coupler and passes through the optical receiver, and the optical receiver outputs the measurement signal, such that the computing unit calculates the distance between the object and a terminal of the detector based on the received measurement signal.

In one embodiment, the flexible optical measuring device further comprises an optical path turning barrel telescoped on one end of the detector, and the optical path turning barrel comprises a housing and a first reflective mirror. The housing is provided with a hole, and the first reflective mirror is disposed in housing and is aligned with the detector and the hole. The measuring beam which is emitted from the light source passes through the detector and reaches to the first reflective mirror and then turns to and passes through the hole to the object and forms the reflected beam, the reflected beam is then reflected from the object and then passes through the hole, and the reflected beam reaches to the first reflective mirror, and then turns to and is reflected back to the detector.

In one embodiment, the flexible optical measuring device further comprises a focusing lens disposed in the hole of the optical path turning barrel.

In one embodiment, the focusing lens is a double-convex lens, a plane-convex lens or an aspheric lens.

In one embodiment, the first reflective mirror is a 45 degree reflective mirror or a turning prism.

In one embodiment, the measuring beam is a laser beam.

In one embodiment, the said one end of the first optical fiber is disposed in alignment with a light spot center of the light source.

In one embodiment, the flexible optical measuring device further comprises a receiving lens disposed between the optical receiver and second optical fiber, and one end of the second optical fiber is disposed in alignment with a lens center of the receiving lens.

This disclosure further provides a flexible optical measuring device for measuring a distance between the device and an object. The flexible optical measuring device comprises an optical distance measuring module, an optical sealed apparatus and a third optical fiber. The optical distance measuring module comprises a light source, an optical receiver and a computing unit. The light source provides a measuring beam. The optical receiver receives a reflected beam reflected from the object and outputs a measurement signal. The computing unit receives the measurement signal. The optical sealed apparatus comprises an apparatus housing, a see-through mirror and a second reflective mirror. The apparatus housing is provided with a first opening, a second opening and a third opening. The see-through mirror is disposed in apparatus housing, and the light source and the first opening are located coaxially, and the see-through mirror is disposed corresponding to the first opening. The second reflective mirror is disposed in the apparatus housing, and the optical receiver and second opening are located coaxially, and the second reflective mirror is disposed corresponding to the second opening. The third optical fiber has a first end and a second end, and the first end of the third optical fiber penetrates through the third opening and extends into the apparatus housing, and the first end is disposed in alignment with the see-through mirror. The measuring beam is emitted from the light source, passes through the first opening and reaches the see-through mirror, and a portion of the measuring beam passes through the see-through mirror and enters the first end of the third optical fiber, and another portion of the measuring beam passes through the second end of the third optical fiber to the object and forms the reflected beam, the reflected beam is then reflected back to the second end and reaches the first end along the third optical fiber and then emits to the see-through mirror. A portion of the reflected beam is reflected to the second reflective mirror and then turns and is emitted to the optical receiver through the second opening, such that the optical receiver outputs the measurement signal, and the computing unit calculates the distance between the object and the second end of the third optical fiber based on the received measurement signal.

In one embodiment, the flexible optical measuring device further comprises an optical path turning barrel telescoped on the second end of the third optical fiber, and the optical path turning barrel comprises a housing and a third reflective mirror. The housing is provided with a hole. The third reflective mirror is disposed in housing and is aligned with the second end of the third optical fiber and the hole. The measuring beam passes through the second end of the third optical fiber, and then reaches to the third reflective mirror and turns to the hole and passes through the hole to the object, and the measuring beam which passes through the hole to the object forms the reflected beam, the reflected beam is reflected back to the hole, and the reflected beam reaches to the third reflective mirror and then turns to and is reflected back to the second end of the third optical fiber.

In one embodiment, the flexible optical measuring device further comprises a focusing lens disposed in the hole of the optical path turning barrel.

In one embodiment, the focusing lens is a double-convex lens, a plane-convex lens or an aspheric lens.

In one embodiment, the flexible optical measuring device further comprises a receiving lens disposed between the optical receiver and the second opening.

In one embodiment, at least one of the second and the third reflective mirrors is a 45 degree reflective mirror or a turning prism.

In one embodiment, the third reflective mirror is a 45 degree reflective mirror or a turning prism.

In one embodiment, the measuring beam is a laser beam.

In one embodiment, the first end of the third optical fiber is disposed in alignment with a light spot center of the light source.

In summary, by disposing the first optical fiber, the second optical fiber or the third optical fiber of the optical coupling module in alignment with the light source and the optical receiver of the optical distance measuring module, the optical fiber of the flexible optical measuring device in this disclosure is allowed to be bent arbitrarily to adjust optical path traveling direction, and to adapt to various unfriendly detection environment and to reduce obstacle in measurement while the detection is performed by the flexible optical measuring device. Meanwhile, the flexible optical measuring device has function of coaxial measuring, such that a minimum distance between the flexible optical measuring device and the object is not limited and an effect of zero-distance measurement can be achieved. In addition, even when detection environments are in machines with complex elements or inside of a transmission pipeline, by a design of the optical path turning barrel capable of greatly changing the traveling direction of the light path, the optical fiber can first be used to extend to a place near the detection environment, and then to greatly change the optical path traveling direction by the optical path turning barrel to perform a measurement to the object. In this way, the flexible optical measuring device can be used at a detection environment with narrow space, and the position of the object is away from a light-emitting position of the optical fiber or a detector.

DETAILED DESCRIPTION OF THE DISCLOSURE

Figure 1A:
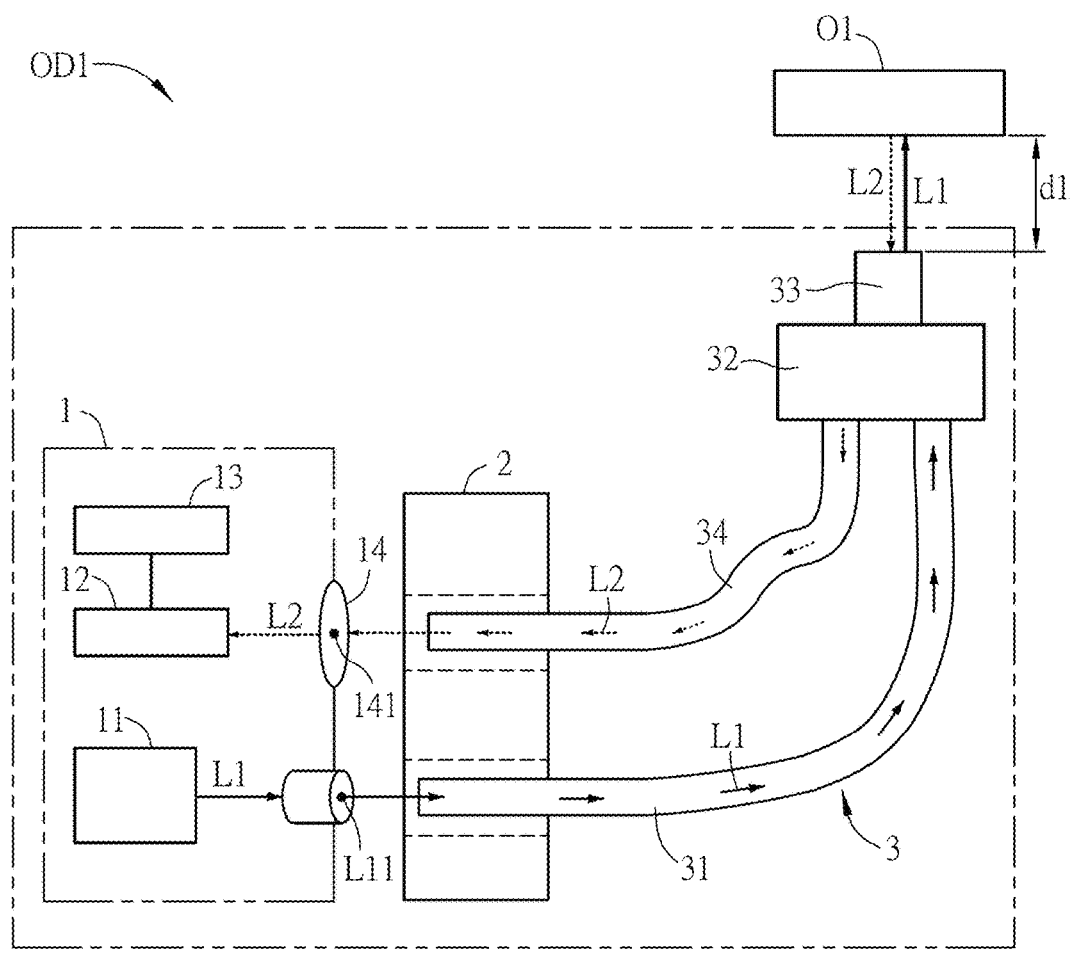
FIG. 1A is a schematic view showing a flexible optical measuring device of first embodiment of this disclosure.

The flexible optical measuring device according to a preferable embodiment of this disclosure will be further described in detail with reference to FIGS. 1A to 5B, and same units are represented by the same reference numerals.

Figure 1B:
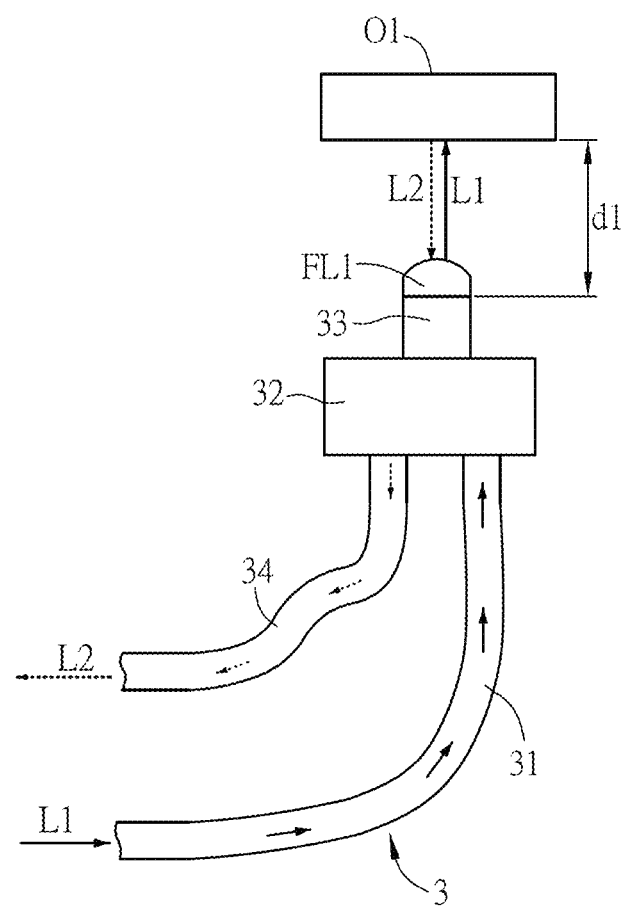
FIG. 1B is a schematic view showing the detector in FIG. 1A with a focusing lens.

In the following, the basic structure and the features of the flexible optical measuring device according to the first embodiment of this disclosure will be described. Please refer to FIG. 1A and FIG. 1B together, FIG. 1A is a schematic view showing a flexible optical measuring device of first embodiment of this disclosure. FIG. 1B is a schematic view showing the detector in FIG. 1A with a focusing lens. In addition, in order to clearly show a direction in which the optical path travels, the measuring beam L1 in FIGs is indicated by a solid line, the reflected beam L2 is indicated by a dotted line, and a separation distance between the measuring beam L1 and reflected beam L2 is particularly widened. The separation distance between them in FIGs is not a ratio of the actual optical path. For the conciseness and ease of illustration, drawing of the reflected beam L2 in the first optical fiber 31 is omitted, so as to clearly express a main optical path of this embodiment. In fact, after the reflected beam L2 is reflected back from the object O1 to the detector 33, it enters the first optical fiber 31 and the second optical fiber 34 simultaneously via the two-in-one optical coupler 32.

The first embodiment of this disclosure provides a flexible optical measuring device OD1 for measuring a distance between the device and an object O1. The flexible optical measuring device OD1 comprises an optical distance measuring module 1, an optical fiber adapter 2 and an optical coupling module 3. The optical distance measuring module 1 comprises a light source 11, an optical receiver 12 and a computing unit 13. The light source 11 provides a measuring beam L1. The optical receiver 12 receives a reflected beam L2 reflected from the object O1, and outputs a measurement signal, such that the computing unit 13 calculates the distance d1 between the terminal of the detector 33 and the object O1 based on the received measurement signal. The measuring beam L1 is a laser beam in the non-visible wavelength range with a wavelength of less than 400 nm or over than 1400 nm, or in the visible wavelength range with a wavelength of 400 nm to 780 nm.

The optical fiber adapter 2 is disposed and connected between the optical distance measuring module 1 and optical coupling module 3. The optical coupling module 3 comprises a first optical fiber 31, a two-in-one optical coupler 32, a detector 33 and a second optical fiber 34. One end of the first optical fiber 31 is disposed corresponding to the light source 11 via the optical fiber adapter 2. The two-in-one optical coupler 32 is connected with the other end of the first optical fiber 31. The detector 33 disposed on one side of the two-in-one optical coupler 32 opposing to the first optical fiber 31. One end of the second optical fiber 34 is disposed corresponding to the optical receiver 12 via the optical fiber adapter 2, and the other end of the second optical fiber 34 is connected to another side of the two-in-one optical coupler 32, and the first optical fiber 31 is also connected to said another side of the two-in-one optical coupler 32.

Next, the traveling direction of the optical path of the first embodiment of the flexible optical measuring device OD1 will be described in detail. In this embodiment, the measuring beam L1 is emitted from the light source 11 and consecutively passes through the first optical fiber 31, the two-in-one optical coupler 32 and reaches the detector 33 and then the measuring beam L1 which is emitted from the light source 11 passes through the detector 33, projects to the object O1, and then forms the reflected beam, and the reflected beam is reflected back to the detector 33, the reflected beam L2 then enters the second optical fiber 34 via the two-in-one optical coupler 32 and passes through the optical receiver 12 such that the optical receiver 12 outputs the measurement signal, and the computing unit 13 calculates the distance d1 between the object O1 and a terminal of the detector 33 based on the received measurement signal. The measuring beam L1 which is emitted from the light source 11 passes through the detector 33, projects to the object O1 and forms the reflected beam L2, and the reflected beam L2 is reflected back to the detector 33 via same optical path. Therefore, the flexible optical measuring device OD1 of this disclosure has the function of coaxial measuring, so that the a minimum distance between the flexible optical measuring device OD1 and the object O1 is not limited, and the effect of zero-distance measurement can be achieved. In addition, with the coaxial measuring feature of the flexible optical measuring device OD1 of this disclosure, the distance d1 between the terminal of the detector 33 and the object O1 can be calculated by the computing unit 13 more accurately.

In this embodiment, one end of the first optical fiber 31 is disposed in alignment with a light spot center L11 of the light source 11, such that one end of the first optical fiber 31 and the light spot center L11 of the light source 11 are located coaxially. Therefore, the first optical fiber 31 can receive the measuring beam L1 emitted from the light source 11 more accurately. In addition, the flexible optical measuring device OD1 further comprises a receiving lens 14 disposed between the optical receiver 12 and the second optical fiber 34, and one end of the second optical fiber 34 is disposed corresponding to a lens center 141 of the receiving lens 14, such that one end of the second optical fiber 34 and the lens center 141 of the receiving lens 14 are located coaxially. Therefore, no deviation occurs when the reflected beam L2 from the second optical fiber 34 passes through the lens center 141 of the receiving lens 14, such that the optical receiver 12 can receive the reflected beam L2 which passes through the second optical fiber 34 more accurately.

In addition, as shown in FIG. 1B, the flexible optical measuring device OD1 can further comprises a focusing lens FL1 disposed on the very end of the emission site of optical path of the flexible optical measuring device OD1. The focusing lens FL1 is disposed on the end of the detector 33, and the focusing lens FL1 is a double-convex lens, a plane-convex lens or an aspheric lens, which concentrates energy of the measuring beam L1 which is emitted from the light source 11 and then passes through the detector 33, and can extend the range of the measurable distance d1 between the object O1 and the terminal of the detector 33.

In the flexible optical measuring device of the first embodiment, the travel of the measuring beam and reflected beam in the optical fiber is not affected by bending of the optical fiber. Therefore, during the measurement, the first optical fiber can be extended or bent arbitrarily, such that the detector is located in front of the object or is attached to the object, then a detection can be performed. The flexible optical measuring device of this embodiment can adapt to various unfriendly detection environments, reduce obstacle in measuring, as well as provide a function of coaxial measurement, such that a minimum distance between the flexible optical measuring device and the object is not limited and the effect of zero-distance measurement can be achieved.

Figure 2A:
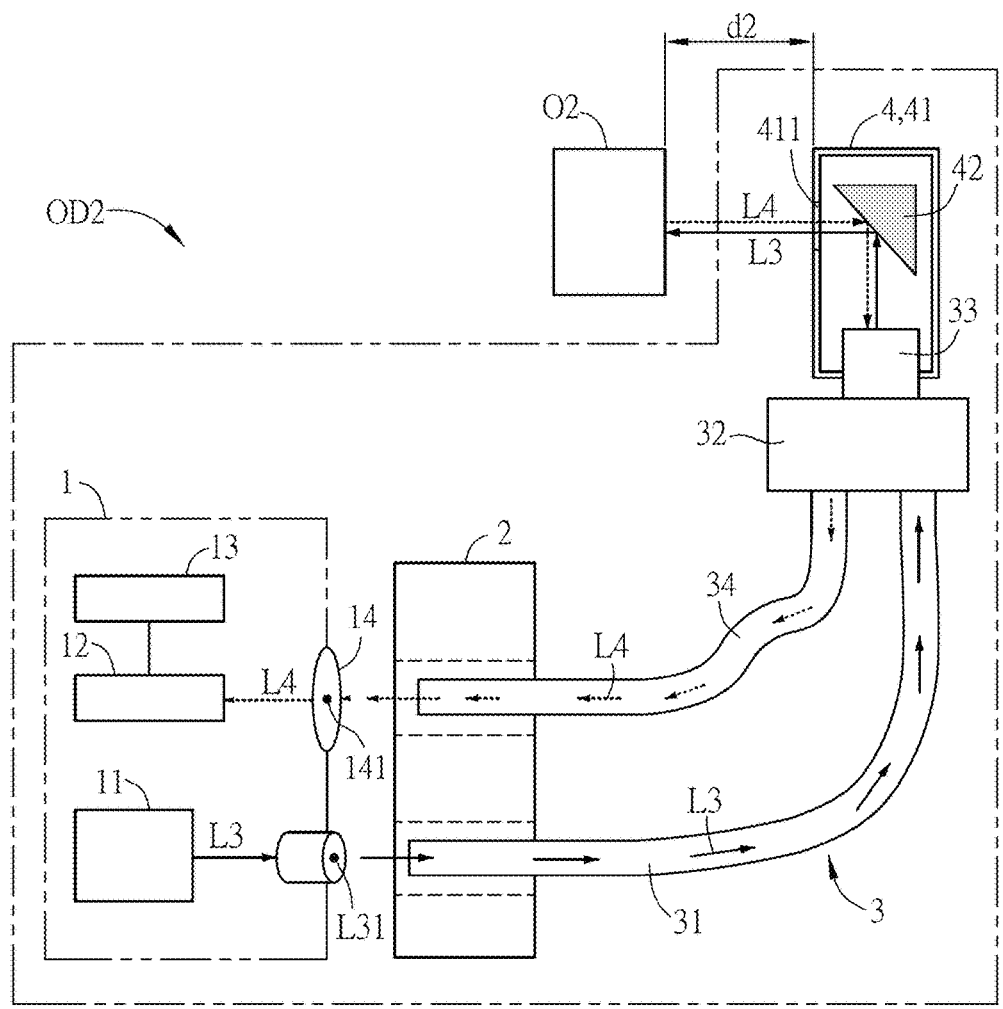
FIG. 2A is a schematic view showing a flexible optical measuring device of second embodiment of this disclosure.
Figure 2B:
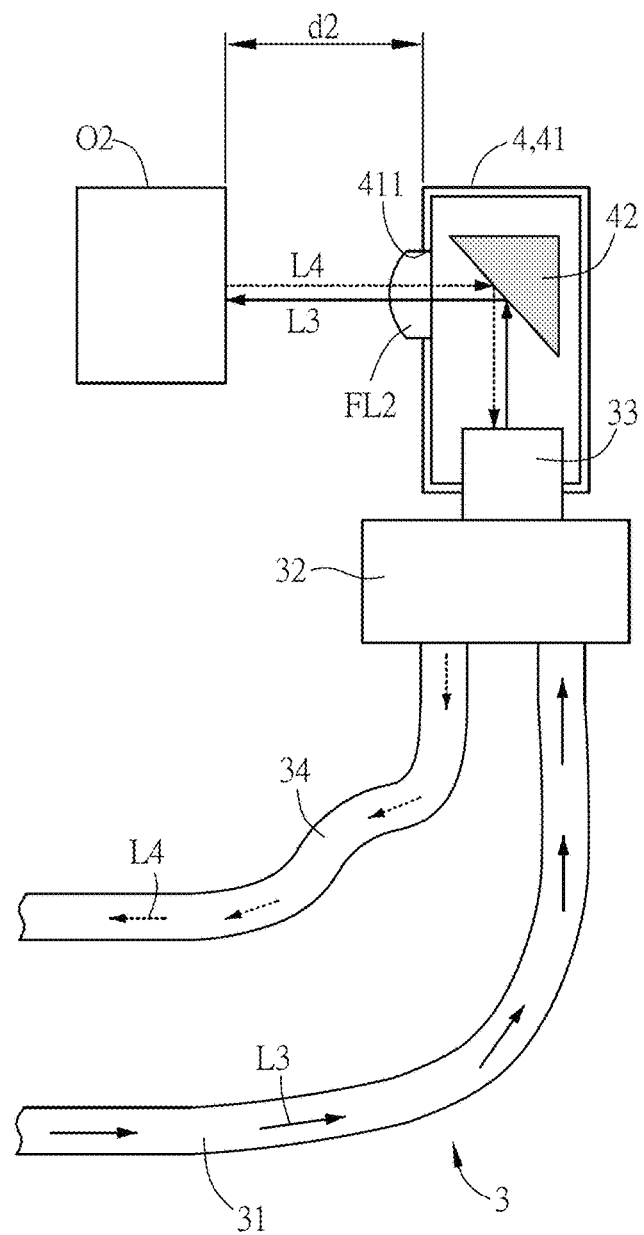
FIG. 2B is a schematic view showing the optical path turning barrel in FIG. 2A with a focusing lens.

In the following, the basic structure and the features of the flexible optical measuring device according to the second embodiment of this disclosure will be described. Please refer to FIG. 2A and FIG. 2B together, FIG. 2A is a schematic view showing a flexible optical measuring device of second embodiment of this disclosure, and FIG. 2B is a schematic view showing the optical path turning barrel in FIG. 2A with a focusing lens. In addition, in order to clearly show a direction in which the optical path travels, the measuring beam L3 in FIGs is indicated by a solid line, the reflected beam L4 is indicated by a dotted line, and a separation distance between the measuring beam L3 and reflected beam L4 is particularly widened. The separation distance between them in FIGs is not a ratio of the actual optical path.

The configurations of the optical distance measuring module 1, optical fiber adapter 2 and optical coupling module 3 of the flexible optical measuring device OD2 in the second embodiment are same with the flexible optical measuring device OD1 in the first embodiment. The only different is that in the second embodiment, the flexible optical measuring device OD2 further comprises an optical path turning barrel 4 telescoped on one end of the detector 33, and the optical path turning barrel 4 comprises a housing 41 and a first reflective mirror 42. The housing 41 is provided with a hole 411. The first reflective mirror 42 is disposed in housing 41 and is aligned with the detector 33 and the hole 411. The first reflective mirror 42 is a 45 degree reflective mirror or other turning prisms, which results in a 90 degree optical path turning effect. The first reflective mirror 42 or other turning prisms with different angles can be changed according to the requirement of the detection environment and the optical path, and the hole 411 of the housing 41 is aligned with the first reflective mirror 42 or other turning prisms.

In the following, an optical path travel direction of the flexible optical measuring device OD2 in the second embodiment will be described in detail. In order to clearly show a direction in which the optical path travels, the measuring beam L3 in FIGs is indicated by a solid line, the reflected beam L4 is indicated by a dotted line, and a separation distance between the measuring beam L3 and reflected beam L4 is particularly widened. The separation distance between them in FIGs is not a ratio of the actual optical path. For the conciseness and ease of illustration, drawing of the reflected beam L4 in the first optical fiber 31 is omitted, so as to clearly express a main optical path of this embodiment. In fact, after the reflected beam L4 is reflected back from the object O2 to the detector 33, it enters the first optical fiber 31 and the second optical fiber 34 simultaneously via the two-in-one optical coupler 32.

In this embodiment, measuring beam L3 is emitted from the light source 11 and consecutively passes through the first optical fiber 31, two-in-one optical coupler 32 and the detector 33. The measuring beam L3 then reaches to the first reflective mirror 42, and turns to the hole 411 and passes through the hole 411 to the object O2, and forms the reflected beam L4 and the reflected beam L4 is reflected back to the hole 411, and then reaches to the first reflective mirror 42, and turns to the and is reflected back to the detector 33, after that, the reflected beam L4 enters the second optical fiber 34 via the two-in-one optical coupler 32 and then reaches to the optical receiver 12, and the optical receiver 12 outputs a measurement signal, such that the computing unit 13 calculates the distance d2 between the hole 411 of the housing 41 and the object O2 based on the received measurement signal. The measuring beam L3 which is emitted from the light source 11 passes through the detector 33, and then reaches to the first reflective mirror 42, and turns to the hole 411 and passes through the hole 411 to the object O2, and forms the reflected beam L4 and the reflected beam L4 is reflected back to the detector 33 via same optical path, such that the flexible optical measuring device OD2 of this embodiment has a function of coaxial measuring, and a minimum distance between the flexible optical measuring device OD2 and the object O2 is not limited and the effect of zero-distance measurement can be achieved. In addition, with the coaxial measuring feature of the flexible optical measuring device OD2 of this disclosure, the distance d2 between the hole 411 of the housing 41 and the object O2 can be calculated by the computing unit 13 more accurately.

In this embodiment, one end of the first optical fiber 31 is disposed in alignment with a light spot center L31 of the light source 11, such that one end of the first optical fiber 31 and the light spot center L31 of the light source 11 are located coaxially. Therefore, the first optical fiber 31 can receive the measuring beam L3 emitted from the light source 11 more accurately. In addition, the flexible optical measuring device OD2 further comprises a receiving lens 14 disposed between the optical receiver 12 and second optical fiber 34, and one end of second optical fiber 34 is disposed corresponding to the lens center 141 of the receiving lens 14, such that one end of the second optical fiber 34 and the lens center 141 of the receiving lens 14 are located coaxially. Therefore, no deviation occurs when the reflected beam L4 from the second optical fiber 34 passes through the lens center 141 of the receiving lens 14, such that the optical receiver 12 can receive the reflected beam L4 which passes through the second optical fiber 34 more accurately.

In addition, as shown in FIG. 2B, the flexible optical measuring device OD2 can further comprises a focusing lens FL2 disposed on the very end of the emission site of the optical path of the flexible optical measuring device OD2, the focusing lens FL2 disposed in the hole 411 of the housing 41, and the focusing lens FL2 is a double-convex lens, a plane-convex lens or an aspheric lens, which concentrate energy of the measuring beam L3 which is emitted from the light source 11 and then passes through the detector 33 and to extend the range of the measurable optical path distance d2 between the object O2 and the hole 411 of the housing 41.

The flexible optical measuring device of the first embodiment, the travel of the measuring beam and reflected beam in the optical fiber is not affected by bending of the optical fiber. Therefore, during the measurement, the first optical fiber can be extended or bent arbitrarily, such that the detector and the optical path turning barrel is located near the object, and then the optical path turning barrel is used to greatly change the optical path traveling direction, then a detection can be performed. The flexible optical measuring device of this disclosure can adapt to various unfriendly detection environment. Even if the detection environment is in machines with complex elements or inside of transmission pipelines, the first optical fiber can first be used to extend a detection site near the object, and then to greatly change the optical path traveling direction by the optical path turning barrel to perform measurement to the object. In this way, the flexible optical measuring device can be used at a detection environment with narrow space, and can overcome the situation that the position of the object and the light-emitting position of the detector is non-coaxial, which reduce the obstacle during the measurement.

Figure 3A:
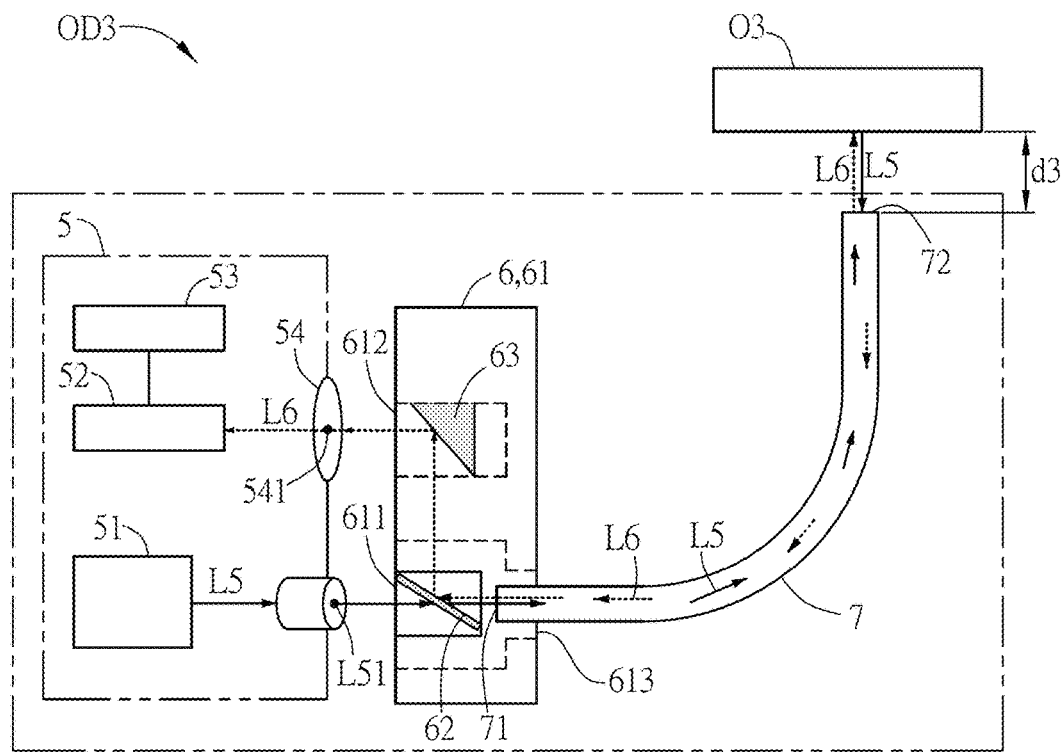
FIG. 3A is a schematic view showing a flexible optical measuring device of third embodiment of this disclosure.
Figure 3B:
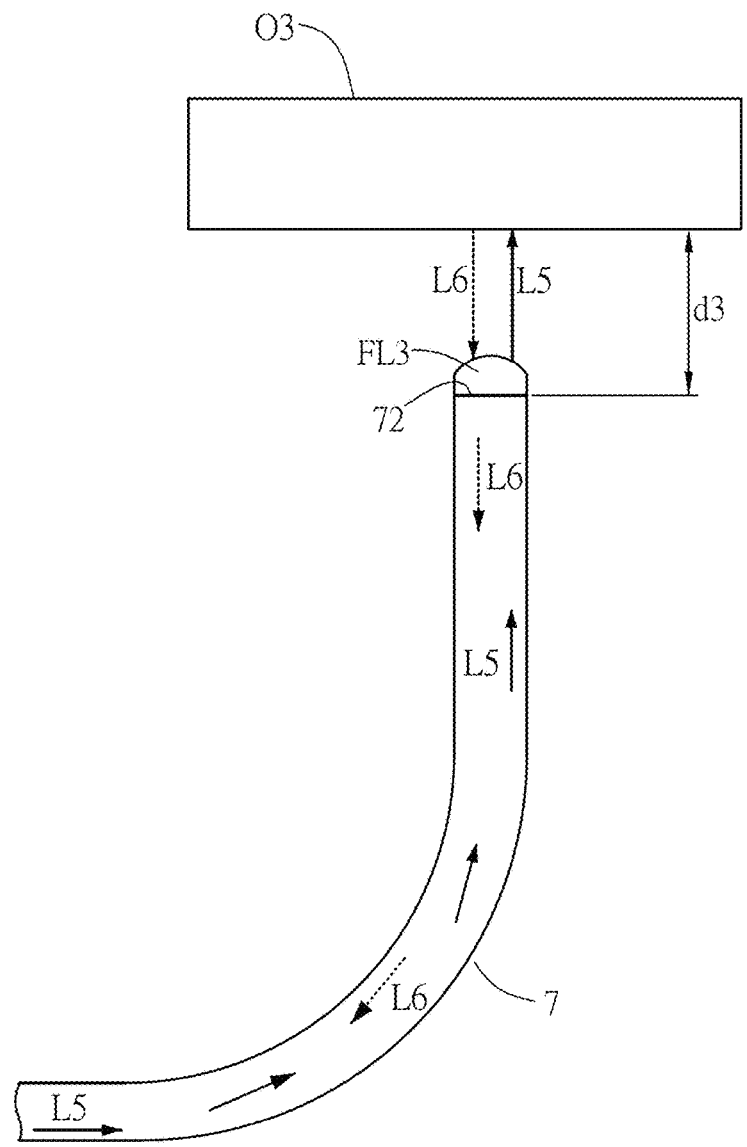
FIG. 3B is a schematic view showing the third optical fiber in FIG. 3A with a focusing lens.

In the following, the basic structure and the features of the flexible optical measuring device according to the third embodiment of this disclosure will be described. Please refer to FIG. 3A and FIG. 3B together, FIG. 3A is a schematic view showing a flexible optical measuring device of third embodiment of this disclosure, and FIG. 3B is a schematic view showing the third optical fiber in FIG. 3A with a focusing lens. In addition, in order to clearly show a direction in which the optical path travels, the measuring beam L5 in FIGs is indicated by a solid line, the reflected beam L6 is indicated by a dotted line, and a separation distance between the measuring beam L5 and reflected beam L6 is particularly widened. The separation distance between them in FIGs is not a ratio of the actual optical.

The third embodiment of this disclosure provides a flexible optical measuring device OD3 for measuring a distance between the device and an object O3. The flexible optical measuring device OD3 comprises an optical distance measuring module 5, an optical sealed apparatus 6 and a third optical fiber 7. The optical distance measuring module 5 comprises a light source 51, an optical receiver 52 and a computing unit 53. The light source 51 provides a measuring beam L5. The optical receiver 52 receives a reflected beam L6 reflected from the object O3, and outputs a measurement signal, such that computing unit 53 calculates the distance d3 between the second end 72 of the third optical fiber 7 and the object O3 based on the received measurement signal. The measuring beam L5 is a laser beam in the non-visible wavelength range with a wavelength of less than 400 nm or over than 1400 nm, or in the visible wavelength range with a wavelength of 400 nm to 780 nm.

The optical sealed apparatus 6 comprises an apparatus housing 61, a see-through mirror 62 and a second reflective mirror 63. The apparatus housing 61 is provided with a first opening 611, a second opening 612 and a third opening 613. The see-through mirror 62 is disposed in apparatus housing 61. The light source 51 and first opening 611 are located coaxially, and the see-through mirror 62 is disposed alignment with a first opening 611. The second reflective mirror 63 is disposed in apparatus housing 61. The optical receiver 52 and second opening 612 are located coaxially, and the second reflective mirror 63 is disposed alignment with second opening 612. The third optical fiber 7 has a first end 71 and a second end 72, and the first end 71 of the third optical fiber 7 penetrates through third opening 613 and extends into the apparatus housing 61, and the first end 71 is disposed in alignment with the see-through mirror 62. The second reflective mirror 63 is a 45 degree reflective mirror or other turning prisms, which results in a 90 degree optical path turning effect. The second reflective mirror 63 or other turning prisms at different angles can be changed according to design requirement of the optical path, and the second opening 612 is disposed in alignment with the second reflective mirror 63 or other turning prisms.

Next, the traveling direction of the optical path of the third embodiment of the flexible optical measuring device OD3 will be described in detail. In this embodiment, the measuring beam L5 is emitted from the light source 51, passes through the first opening 611 and reaches the see-through mirror 62, a portion of the measuring beam L5 reflected from the see-through mirror 62 (not shown), and another portion of measuring beam L5 passes through the see-through mirror 62 and enters the first end 71 of the third optical fiber 7. A portion of the measuring beam L5 passes through the second end 72 of the third optical fiber 7 to the object O3 and forms the reflected beam. The reflected beam is then reflected back to the second end 72 and reaches the first end 71 along the third optical fiber 7 and then emits to the see-through mirror 62. A portion of the reflected beam L6 is transmitted from the see-through mirror 62 (not shown), and another portion of reflected beam L6 is reflected to the second reflective mirror 63 and then turns and is emitted to the optical receiver 52 through the second opening 612, such that the optical receiver 52 outputs the measurement signal, and the computing unit 53 calculates the distance d3 between the object O3 and the second end 72 of the third optical fiber 7 based on the received measurement signal. The measuring beam L5 passes through the second end 72 of the third optical fiber 7 to the object O3 and forms the reflected beam L6 and the reflected beam L6 is reflected back to the second end 72 of the third optical fiber 7 via same optical path, such that the flexible optical measuring device OD3 of this embodiment has a function of coaxial measuring. Therefore, a minimum distance between the flexible optical measuring device OD3 and the object O3 is not limited and the effect of zero-distance measurement can be achieved. In addition, with the coaxial measuring feature of the flexible optical measuring device OD3 of this disclosure, the distance d3 between the second end 72 of the third optical fiber 7 and the object O3 can be calculated by the computing unit 53 more accurately.

In this embodiment, the first end 71 of the third optical fiber 7 is disposed in alignment with a light spot center L51 of the light source 51, such that the first end 71 of the third optical fiber 7 and the light spot center L51 of the light source 51 are located coaxially. Therefore, the third optical fiber 7 can receive the measuring beam L5 emitted from the light source 51 more accurately. In addition, the flexible optical measuring device OD3 further comprises a receiving lens 54 disposed between the optical receiver 52 and the second opening 612. Ideally, the travelling path of the reflected beam L6 reflected by the second reflective mirror 63 passes through a lens center 541 of the receiving lens 54. Therefore, no deviation occurs when the reflected beam L6 passes through the lens center 541 of the receiving lens 54, such that the optical receiver 52 can receive the reflected beam L6 reflected from the second reflective mirror 63 more accurately.

As shown in FIG. 3B, the flexible optical measuring device OD3 can further comprises a focusing lens FL3 disposed on the very end of the emission of optical path of the flexible optical measuring device OD3, the focusing lens FL3 is disposed on the second end 72 of the third optical fiber 7. The focusing lens FL3 is a double-convex lens, plane-convex lens or an aspheric lens, which concentrates energy of the measuring beam L5 which is emitted from the light source 11 and passed through the detector 33 to extend the range of the measurable distance d3 between the object O3 and the second end 72 of the third optical fiber 7. In addition, focusing lens FL3 can further concentrate energy of the measuring beam L5 and reflected beam L6, such that a reflection loss of the measuring beam L5 resulting from passing through the see-through mirror 62 is reduces, and a penetration loss of the reflected beam L6 resulting from passing through the see-through mirror 62 is reduced, so that the energy intensity of the reflected beam L6 finally reaching the optical receiver 52 is still recognizable.

In the flexible optical measuring device of the third embodiment, the travel of the measuring beam and the reflected beam in the optical fiber is not affected by bending of the optical fiber. Therefore, during the measurement, the third optical fiber can be extended or bent arbitrarily, such that the detector is located in front of the object or is attached to the object, then a detection can be performed. The flexible optical measuring device of this embodiment can adapt to various unfriendly detection environments, reduce obstacle in measuring, as well as provide a function of coaxial measurement, such that a minimum distance between the flexible optical measuring device and the object is not limited and the effect of zero-distance measurement can be achieved.

Figure 4A:
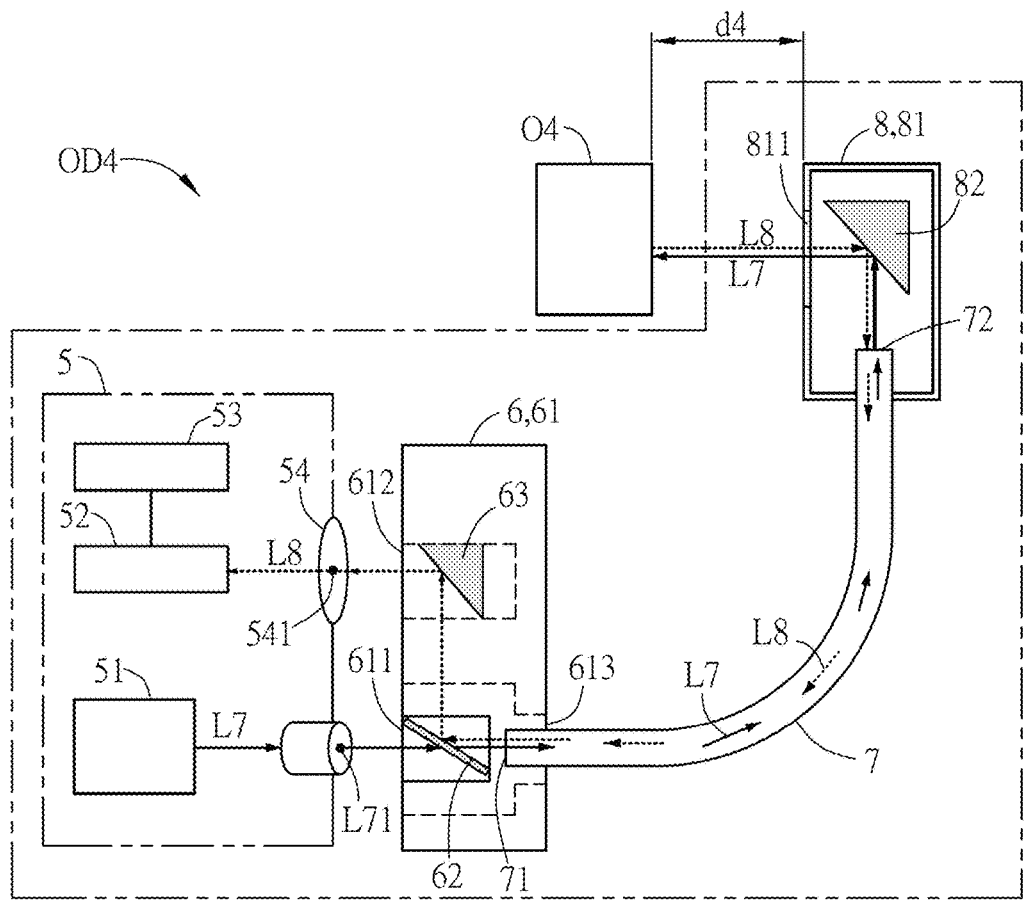
FIG. 4A is a schematic view showing a flexible optical measuring device of fourth embodiment of this disclosure.
Figure 4B:
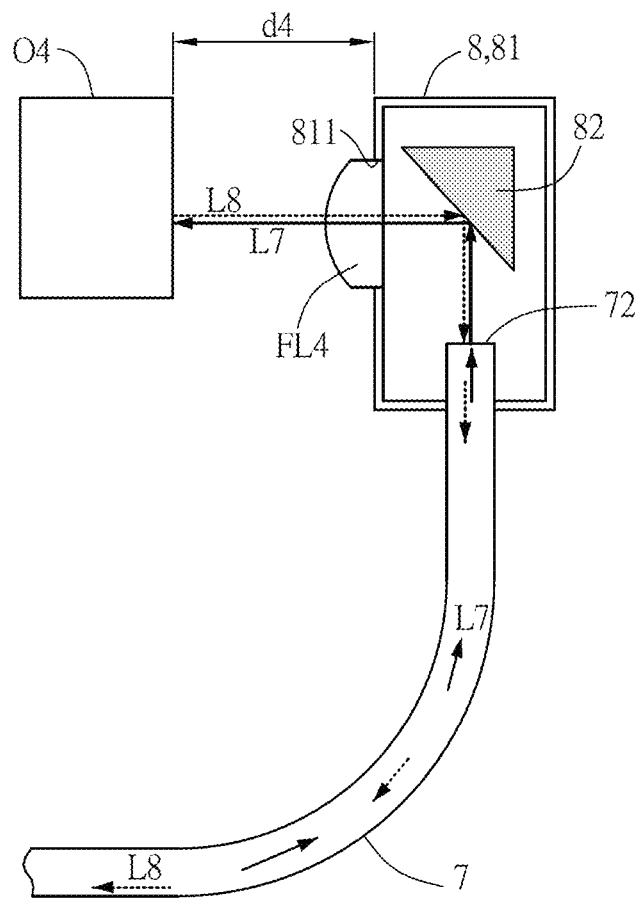
FIG. 4B is a schematic view showing the optical path turning barrel in FIG. 4A with a focusing lens.

In the following, the basic structure and the features of the flexible optical measuring device according to the fourth embodiment of this disclosure will be described. Please refer to FIG. 4A and FIG. 4B, FIG. 4A is a schematic view showing a flexible optical measuring device of fourth embodiment of this disclosure. FIG. 4B is a schematic view showing the optical path turning barrel in FIG. 4A with a focusing lens. In addition, in order to clearly show a direction in which the optical path travels, the measuring beam L7 in FIGs is indicated by a solid line, the reflected beam L8 is indicated by a dotted line, and a separation distance between the measuring beam L7 and reflected beam L8 is particularly widened. The separation distance between them in FIGs is not a ratio of the actual optical path.

The configurations of the optical distance measuring module 5, optical sealed apparatus 6 and third optical fiber 7 of the flexible optical measuring device OD4 in the fourth embodiment are same with the flexible optical measuring device OD3 in the third embodiment. The only different is that in the fourth embodiment, flexible optical measuring device OD4 further comprises an optical path turning barrel 8 telescoped on second end 72 of the third optical fiber 7, The optical path turning barrel 8 comprises a housing 81 and a third reflective mirror 82. The housing 81 is provided with a hole 811. The third reflective mirror 82 is disposed in the housing 81, and is aligned with the second end 72 of the third optical fiber 7 and the hole 811. The third reflective mirror 82 is a 45 degree reflective mirror or other turning prisms, which results in a 90 degree optical path turning effect. The third reflective mirror 82 or other turning prisms with different angles can be changed according to the detection environment and the optical path, and the hole 811 of the housing 81 is aligned with the third reflective mirror 82 or other turning prisms.

The traveling direction of the optical path of the fourth embodiment of the flexible optical measuring device OD4 will be described in detail. In this embodiment, the measuring beam L7 is emitted from the light source 51, passes through the first opening 611 and reaches the see-through mirror 62, a portion of the measuring beam L7 reflected from the see-through mirror 62 (not shown), and another portion of measuring beam L7 passes through the see-through mirror 62 and enters the first end 71 of the third optical fiber 7. A portion of the measuring beam L7 passes through the second end 72 of the third optical fiber 7, the measuring beam L7 reaches the third reflective mirror 82 and then turns and is emitted to the object O4 through the hole 811 and forms the reflected beam L8, the reflected beam L8 is then reflected back to the hole 811 and reaches the third reflective mirror 82 and then turns and is reflected back to the second end 72 of the third optical fiber 7. The reflected beam L8 reaches the first end 71 along the third optical fiber 7 and then emits to the see-through mirror 62. A portion of the reflected beam L8 is transmitted from the see-through mirror 62 (not shown), and another portion of the reflected beam L8 is reflected to the second reflective mirror 63 and then turns and is emitted to the optical receiver 52 through the second opening 612, such that the optical receiver 52 outputs the measurement signal, and the computing unit 53 calculates the distance d4 between the object O4 and the hole 811 of the housing 81 based on the received measurement signal. The measuring beam L7 passes through the second end 72 of the third optical fiber 7, and then reaches to the first reflective mirror 82, and turns to the hole 811 and passes through the hole 811 to the object O4, and forms the reflected beam L8 which is reflected back to the second end 72 of the third optical fiber 7 via same optical path, such that the flexible optical measuring device OD4 of this embodiment has a function of coaxial measuring. Therefore, a minimum distance between the flexible optical measuring device OD4 and the object O4 is not limited and the effect of zero-distance measurement can be achieved. In addition, with the coaxial measuring feature of the flexible optical measuring device OD4 of this disclosure, the distance d4 between the hole 811 of the housing 81 and the object O4 can be calculated by the computing unit 53 more accurately.

In this embodiment, first end 71 of the third optical fiber 7 is disposed in alignment with a light spot center L71 of the light source 51, such that first end 71 of the third optical fiber 7 and the light spot center L71 of the light source 51 are located coaxially. Therefore, the third optical fiber 7 can receive the measuring beam L7 passing through the light source 51 more accurately. In addition, the flexible optical measuring device OD4 further comprises a receiving lens 54 disposed between the optical receiver 52 and the second opening 612. Ideally, the travelling path of the reflected beam L8 reflected by the second reflective mirror 63 passes through a lens center 541 of the receiving lens 54. Therefore, no deviation occurs when the reflected beam L8 passes through the lens center 541 of the receiving lens 54, such that the optical receiver 52 can receive the reflected beam L8 reflected from the second reflective mirror 63 more accurately.

In addition, as shown in FIG. 4B, the flexible optical measuring device OD4 can further comprises a focusing lens FL4 disposed on the very end of the emission site of the optical path of the flexible optical measuring device OD4, the focusing lens FL4 disposed in the hole 811 of the housing 81. The focusing lens FL4 is a double-convex lens, a plane-convex lens or an aspheric lens, which concentrates energy of the measuring beam L7 which is emitted from the light source 51 and then passes through the detector 33 to extend the range of the measurable distance d4 between the object O4 and the hole 811 and the housing 81. In addition, focusing lens FL4 can further concentrate energy of the measuring beam L7 and the reflected beam L8, such that a reflection loss of the measuring beam L7 resulting from passing through the see-through mirror 62 is reduced, and a penetration loss of the reflected beam L8 resulting from passing through the see-through mirror 62, so that the energy intensity of the reflected beam L8 finally reaching the optical receiver 52 is still recognizable.

In the flexible optical measuring device of the fourth embodiment, the travel of the measuring beam and reflected beam in the optical fiber is not affected by bending of the optical fiber. Therefore, during the measurement, the third optical fiber can be extended or bent arbitrarily, such that the detector and the optical path turning barrel is located near the object, and then the optical path turning barrel is used to greatly change the optical path traveling direction, then a detection can be performed. The flexible optical measuring device of this disclosure can adapt to various unfriendly detection environment. Even if the detection environment are in machines with complex elements or inside of transmission pipelines, the third optical fiber can first be used to extend a detection site near the object, and then to greatly change the optical path traveling direction by the optical path turning barrel to perform the measurement to the object. In this way, the flexible optical measuring device can be used at a detection environment with narrow space, and overcome the situation that the position of the object and the light-emitting position of the detector is non-coaxial, which reduce the obstacle during the measurement.

In summary, in the flexible optical measuring device of this disclosure, the travel of the measuring beam and the reflected beam in the optical fiber is not affected by the bending of the optical fiber. Therefore, during the measurement, the first optical fiber, the second optical fiber or the third optical fiber can be extended or bent arbitrarily, such that the detector is located in front of the object or is attached to the object, then a detection can be processed. The flexible optical measuring device of this embodiment can adapt to various unfriendly detection environments, reduce obstacle in measuring, as well as provide a function of coaxial measurement, such that a minimum distance between the flexible optical measuring device and the object is not limited and the effect of zero-distance measurement can be achieved.

In addition, even when detection environments are in machines with complex elements or inside of a transmission pipeline, by a design of the optical path turning barrel capable of greatly changing the traveling direction of the light path, the first optical fiber or the third optical fiber can first be used to extend to a place near the detection environment, and then to greatly change the optical path traveling direction by the optical path turning barrel to perform the measurement to the object. In this way, the flexible optical measuring device can be used at a detection environment with narrow space, and overcome the situation that the position of the object and the light-emitting position of the detector is non-coaxial, which reduce the obstacle during the measurement.

The foregoing is only illustrative and not a limiting sense. Any without departing from the spirit and scope of the invention, and its equivalent modifications and variations should be included in the appended claims.

What is claimed is:

1. A flexible optical measuring device for measuring a distance between the device and an object, comprising:
    an optical distance measuring module, comprising:
        a light source providing a measuring beam;
        an optical receiver receiving a reflected beam reflected from the object, and outputting a measurement signal; and
        a computing unit receiving the measurement signal;
    an optical fiber adapter; and
    an optical coupling module, wherein the optical fiber adapter is disposed and connected between the optical distance measuring module and the optical coupling module, and the optical coupling module comprises:
        a first optical fiber, wherein one end of the first optical fiber is disposed corresponding to the light source via the optical fiber adapter;
        a two-in-one optical coupler connected with the other end of the first optical fiber;
        a detector disposed on one side of the two-in-one optical coupler opposing to the first optical fiber; and
        a second optical fiber, wherein one end of the second optical fiber is disposed corresponding to the optical receiver via the optical fiber adapter, and the other end of the second optical fiber is connected to another side of the two-in-one optical coupler, and the first optical fiber is also connected to said another side of the two-in-one optical coupler, wherein the first optical fiber and the second optical fiber are optically independent from each other when the first optical fiber and the second optical fiber are disposed corresponding to the light receiver and the optical receiver, respectively, via the optical fiber adapter;
    wherein the measuring beam is emitted from the light source and consecutively passes through the first optical fiber, the two-in-one optical coupler and the detector to the object and forms the reflected beam and the reflected beam is reflected back to the detector, the reflected beam then enters the second optical fiber via the two-in-one optical coupler and passes through the optical receiver such that the optical receiver outputs the measurement signal, and the computing unit calculates the distance between the object and a terminal of the detector based on the received measurement signal.

2. The device according to claim 1, further comprising a focusing lens disposed on the terminal of the detector.

3. The device according to claim 2, wherein the focusing lens is a double-convex lens, a plane-convex lens or an aspheric lens.

4. The device according to claim 1, further comprising:
    an optical path turning barrel telescoped on one end of the detector, wherein the optical path turning barrel comprises:
        a housing provided with a hole; and
        a first reflective mirror disposed in the housing and aligned with the detector and the hole;
    wherein, the measuring beam which is emitted from the light source passes through the detector and reaches to the first reflective mirror and then turns to and passes through the hole to the object, the measuring beam which passes through the hole to the object forms the reflected beam, the reflected beam is then reflected from the object and then passes through the hole the reflected beam reaches to the first reflective mirror, and then turns to and is reflected back to the detector.

5. The device according to claim 4, further comprising a focusing lens disposed in the hole of the housing.

6. The device according to claim 5, wherein the focusing lens is a double-convex lens, a plane-convex lens or an aspheric lens.

7. The device according to claim 4, wherein the first reflective mirror is a 45 degree reflective mirror or a turning prism.

8. The device according to claim 1, wherein the measuring beam is a laser beam.

9. The device according to claim 1, wherein said one end of the first optical fiber is disposed in alignment with a light spot center of the light source.

10. The device according to claim 1, further comprising a receiving lens disposed between the optical receiver and the second optical fiber, wherein one end of the second optical fiber is disposed in alignment with a lens center of the receiving lens.

11. The device according to claim 1, wherein the device comprises only one optical coupling module, and the optical coupling module comprises only one two-in-one optical coupler.

* * * * *